US 11,248,707 B2
(12) United States Patent
Imura et al.

(10) Patent No.: US 11,248,707 B2
(45) Date of Patent: Feb. 15, 2022

(54) SLIDING COMPONENT

(71) Applicant: EAGLE INDUSTRY CO., LTD., Tokyo (JP)

(72) Inventors: Tadatsugu Imura, Tokyo (JP); Ayano Tanishima, Tokyo (JP); Hideyuki Inoue, Tokyo (JP); Yuichiro Tokunaga, Tokyo (JP); Takeshi Hosoe, Tokyo (JP); Yuta Negishi, Tokyo (JP); Yuki Maetani, Tokyo (JP)

(73) Assignee: EAGLE INDUSTRY CO., LTD, Tokyo (JP)

( * ) Notice: Subject to any disclaimer, the term of this patent is extended or adjusted under 35 U.S.C. 154(b) by 210 days.

(21) Appl. No.: 16/610,855

(22) PCT Filed: May 15, 2018

(86) PCT No.: PCT/JP2018/018623
§ 371 (c)(1),
(2) Date: Nov. 4, 2019

(87) PCT Pub. No.: WO2018/212143
PCT Pub. Date: Nov. 22, 2018

(65) Prior Publication Data
US 2021/0054934 A1 Feb. 25, 2021

(30) Foreign Application Priority Data
May 19, 2017 (JP) .............................. JP2017-099498

(51) Int. Cl.
*F16J 15/34* (2006.01)
*F16C 33/10* (2006.01)
*F16C 33/74* (2006.01)

(52) U.S. Cl.
CPC ........... *F16J 15/3424* (2013.01); *F16J 15/34* (2013.01); *F16J 15/3412* (2013.01);
(Continued)

(58) Field of Classification Search
CPC ...... F16J 15/34; F16J 15/3412; F16J 15/3424; F16C 33/74
See application file for complete search history.

(56) References Cited

U.S. PATENT DOCUMENTS

| 4,789,250 A | 12/1988 | Schluter |
| 9,228,660 B2 | 1/2016 | Hosoe et al. |

(Continued)

FOREIGN PATENT DOCUMENTS

| CN | 101016949 A | 8/2007 |
| CN | 103090005 B | 4/2014 |

(Continued)

OTHER PUBLICATIONS

Extended European Search Report (EESR) dated Dec. 21, 2020, issued for European counterpart patent application No. EP18802992.0 (6 pages).

(Continued)

*Primary Examiner* — Nicholas L Foster
(74) *Attorney, Agent, or Firm* — Law Office of Katsuhiro Arai

(57) ABSTRACT

In an exemplary embodiment, a pair of sliding components has sliding surfaces that slide with respect to each other, wherein at least one of the sliding surfaces, sliding surface S, includes a random dimple group 11 in which plural dimples 10 are randomly arranged, and the random dimple group 11 is arranged to be biased in the circumferential direction of the sliding surface S. The sliding components have an improved lubricating property and reliability of a sealing property.

6 Claims, 8 Drawing Sheets

(52) U.S. Cl.
CPC .......... *F16C 33/1025* (2013.01); *F16C 33/74* (2013.01); *F16J 15/3408* (2013.01)

(56) References Cited

U.S. PATENT DOCUMENTS

| | | | |
|---|---|---|---|
| 9,494,239 | B2 | 11/2016 | Hosoe et al. |
| 9,829,043 | B2 * | 11/2017 | Inoue .................... F16J 15/3424 |
| 9,915,289 | B2 * | 3/2018 | Inoue ....................... F16C 17/02 |
| 9,951,873 | B2 | 4/2018 | Inoue et al. |
| 9,970,478 | B2 | 5/2018 | Inoue et al. |
| 10,132,411 | B2 * | 11/2018 | Hosoe ................... F16C 17/045 |
| 10,473,220 | B2 * | 11/2019 | Tokunaga ............. F16C 33/107 |
| 11,053,975 | B2 * | 7/2021 | Imura .................. F16C 33/1025 |
| 2003/0178781 | A1 | 9/2003 | Tejima |
| 2003/0189294 | A1 | 10/2003 | Tejima |
| 2011/0215531 | A1 | 9/2011 | Tokunaga et al. |
| 2011/0233872 | A1 | 9/2011 | Iguchi et al. |
| 2014/0167362 | A1 | 6/2014 | Hosoe et al. |
| 2015/0260292 | A1 | 9/2015 | Inoue et al. |
| 2016/0195139 | A1 | 7/2016 | Inoue et al. |
| 2017/0227056 | A1 * | 8/2017 | Inoue ....................... F16C 33/74 |
| 2017/0234431 | A1 | 8/2017 | Katori et al. |
| 2018/0017163 | A1 | 1/2018 | Hosoe et al. |
| 2018/0038411 | A1 * | 2/2018 | Inoue .................... F16J 15/3412 |
| 2018/0058502 | A1 | 3/2018 | Hosoe et al. |
| 2018/0172162 | A1 | 6/2018 | Tokunaga et al. |
| 2019/0170257 | A1 | 6/2019 | Hosoe et al. |
| 2019/0264737 | A1 | 8/2019 | Itadani |
| 2019/0316682 | A1 | 10/2019 | Negishi et al. |
| 2020/0158162 | A1 * | 5/2020 | Imura ................... F16C 17/045 |
| 2020/0182356 | A1 | 6/2020 | Itadani et al. |
| 2020/0224722 | A1 | 7/2020 | Imura et al. |
| 2020/0224768 | A1 * | 7/2020 | Imura .................. F16J 15/3424 |
| 2020/0378501 | A1 * | 12/2020 | Tanishima ............... F16J 15/34 |
| 2021/0048106 | A1 * | 2/2021 | Imura ................... F16C 33/103 |

FOREIGN PATENT DOCUMENTS

| | | |
|---|---|---|
| CN | 203641506 U | 6/2014 |
| EP | 1350996 A2 | 10/2003 |
| EP | 3048341 A1 | 7/2016 |
| EP | 3627011 A1 | 3/2020 |
| JP | S631814 A | 1/1988 |
| JP | 2001221179 A | 8/2001 |
| JP | 2003343741 A | 12/2003 |
| JP | 2004003578 A | 1/2004 |
| JP | 2004162907 A | 6/2004 |
| JP | 4316956 B2 | 8/2009 |
| JP | 4557223 B2 | 10/2010 |
| JP | 2011185292 A | 9/2011 |
| JP | 5456772 B2 | 4/2014 |
| WO | 02093046 A1 | 11/2002 |
| WO | 2013031530 A1 | 3/2013 |
| WO | 2014112455 A1 | 7/2014 |
| WO | 2015041048 A1 | 3/2015 |
| WO | 2016035860 A1 | 3/2016 |
| WO | 2016129553 A1 | 8/2016 |
| WO | 2016143721 A1 | 9/2016 |
| WO | 2016203878 A1 | 12/2016 |
| WO | 2018043307 A1 | 3/2018 |
| WO | 2018070265 A1 | 4/2018 |
| WO | 2018088353 A1 | 5/2018 |
| WO | 2018092829 A1 | 5/2018 |

OTHER PUBLICATIONS

Extended European Search Report (EESR) dated Dec. 23, 2020, issued for related European patent application No. EP18803055.5 (6 pages).
Extended European Search Report (EESR) dated Feb. 17, 2021, issued for related European patent application No. EP18832266.3 (7 pages).
International Search Report (ISR) dated Jun. 26, 2018, issued for related International application No. PCT/JP2018/018624. (2 pages).
International Search Report (ISR) dated Sep. 25, 2018, issued for related International application No. PCT/JP2018/026251. (2 pages).
Non-Final Office Action issued by U.S. Patent and Trademark Office, dated Jan. 27, 2021, for a co-pending U.S. Appl. No. 16/610,844. (12 pages).
Non-Final Office Action issued by U.S. Patent and Trademark Office, dated Sep. 30, 2020, for a co-pending U.S. Appl. No. 16/626,838. (14 pages).
International Search Report (ISR) dated Jul. 10, 2018, issued for International application No. PCT/JP2018/018623. (1 page).

* cited by examiner

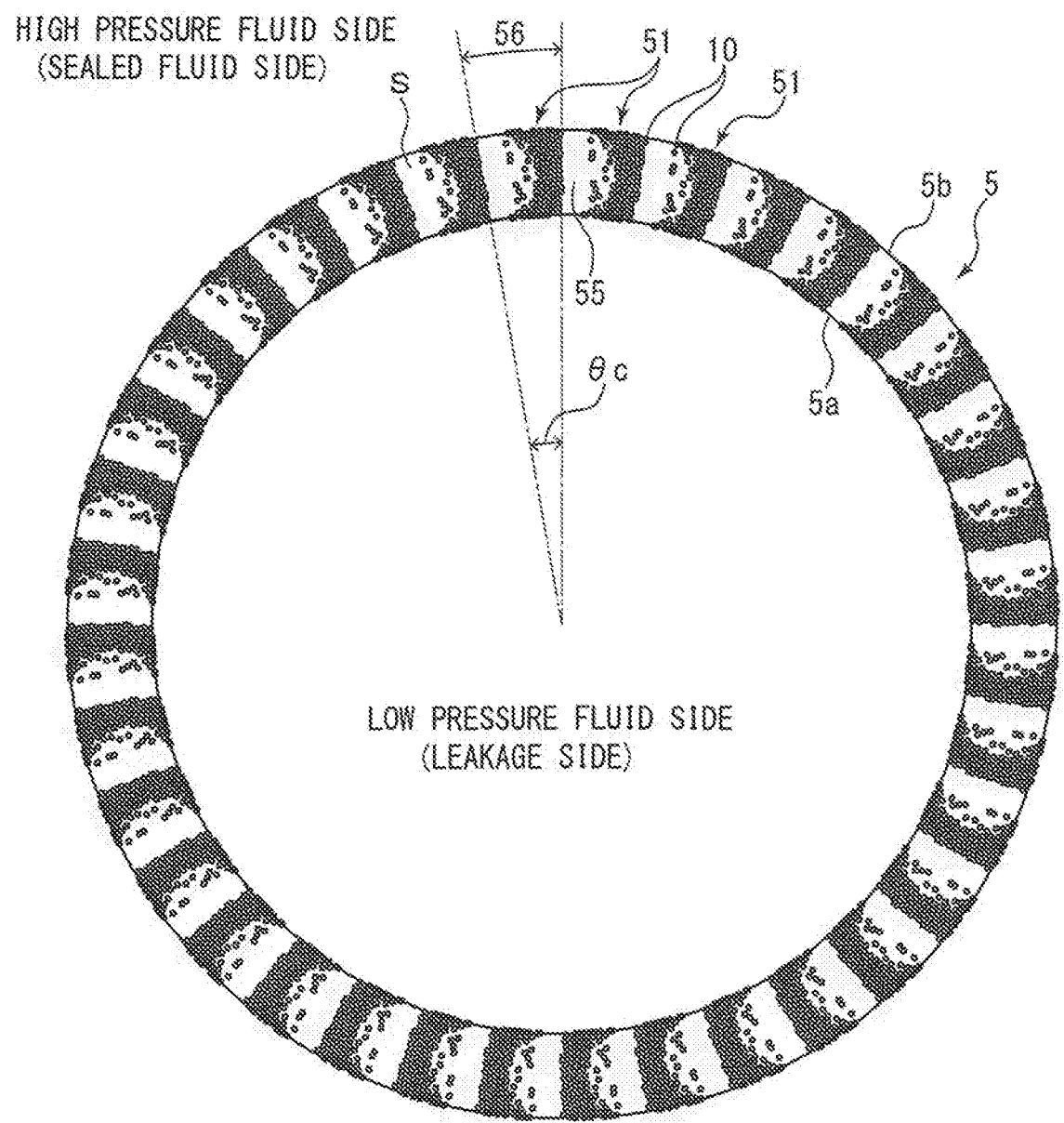

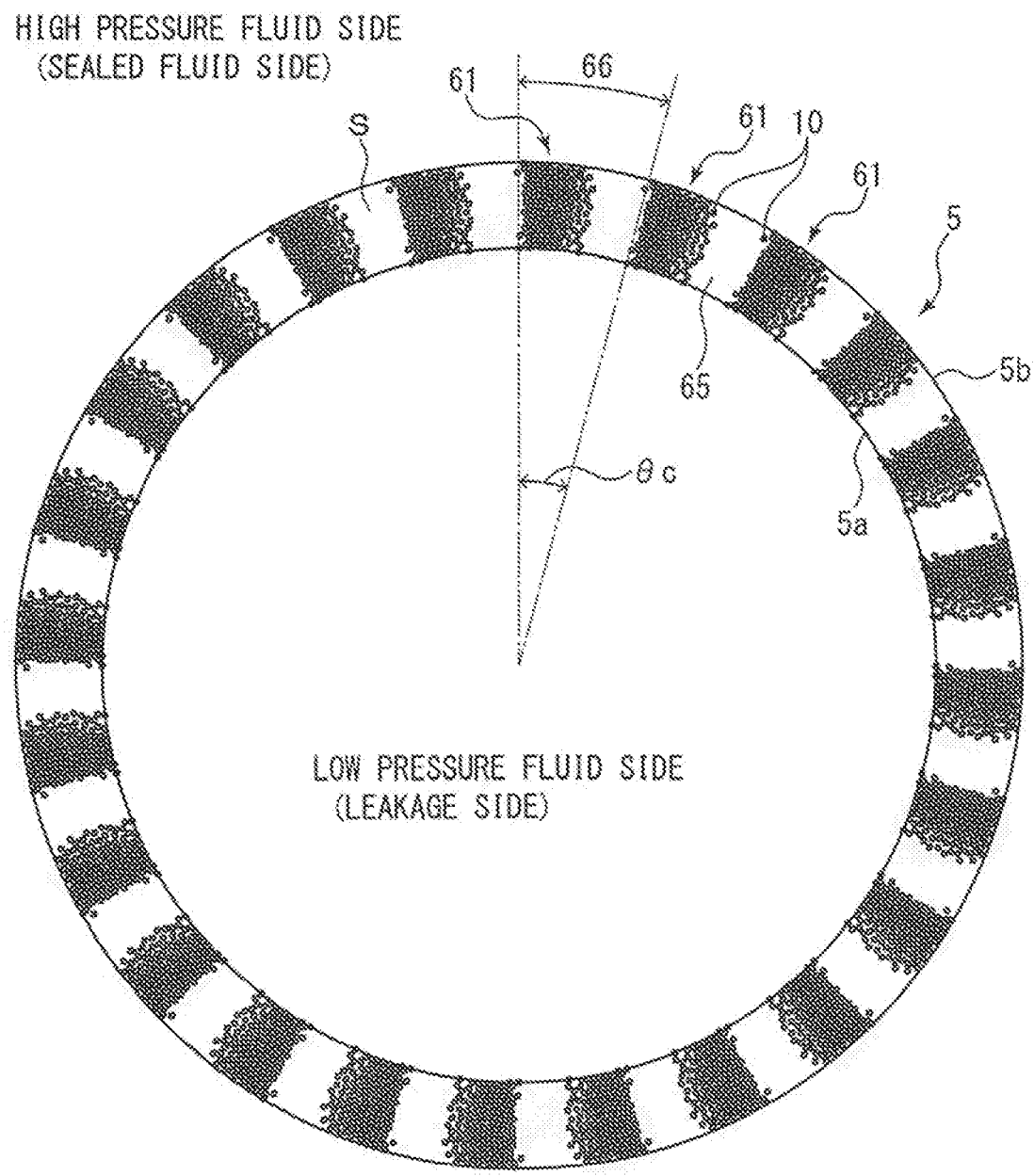

SLIDING COMPONENT

CROSS-REFERENCE TO RELATED APPLICATIONS

This application is the U.S. National Phase under 35 U.S.C. § 371 of International Application PCT/JP2018/018623, filed May 15, 2018, which claims priority to Japanese Patent Application No. JP2017-099498, filed May 19, 2017. The International Application was published under PCT Article 21(2) in a language other than English.

TECHNICAL FIELD

The present invention relates to a sliding component suitable, for example, as a mechanical seal, a sliding bearing, and other sliding units. In particular, the present invention relates to a sliding component such as a seal ring or a bearing that requires reduction of friction by interposing a fluid between sliding surfaces, and prevention of leakage of the fluid from the sliding surfaces.

BACKGROUND ART

In a mechanical seal serving as an example of a sliding component, while maintaining a sealing property, sliding friction during rotation is required to be reduced to the extreme. By variously texturing the sliding surfaces, a method of reducing friction is realized. For example, as one of texturing, arrangement of dimples on the sliding surfaces is known.

Conventionally, in a case where dimples are provided on a sliding surface, plural dimples are arranged and aligned in order in general. For example, in the invention described in JP 2003-343741 A (hereinafter, referred to as "Patent Document 1"), for the purpose of reducing a friction coefficient of a sliding surface and improving a sealing ability, plural thin and long dimples are provided and aligned in order in a regular manner on the sliding surface so that the inclination directions of the dimples are different between the outer peripheral side and the inner peripheral side with a border reference line X as a borderline. Leading ends in the rotation direction of the dimples on the outer peripheral side are inclined toward the outer peripheral side, and leading ends in the rotation direction of the dimples on the inner peripheral side are inclined toward the inner peripheral side.

Conventionally, in order to improve a lubricating property, random arrangement of plural dimples is also known. For example, in the invention described in JP 2001-221179 A (hereinafter, referred to as "Patent Document 2"), plural dimples are randomly arranged on an inner wall of a cylinder of a rotary compressor and a leading end surface and both side end surfaces of a sliding vane.

CITATION LIST

Patent Documents

Patent Document 1: JP 2003-343741 A
Patent Document 2: JP 2001-221179 A

SUMMARY OF THE INVENTION

Technical Problem

However, in the invention described in Patent Document 1, since the dimples are arranged and aligned in order, an effect of suctioning from the leakage side to the sliding surface and an effect of flowing from the sealed fluid side to the sliding surface are low. Thus, there is a need for a complicated configuration in which the leading ends in the rotation direction of the dimples on the outer peripheral side are inclined toward the outer peripheral side and the leading ends in the rotation direction of the dimples on the inner peripheral side are inclined toward the inner peripheral side. Since a fluid concentrates on a radially center portion of the sliding surface, there is also a problem that the entire sliding surface cannot be uniformly lubricated.

The invention described in Patent Document 2 is just to randomly arrange the plural dimples in order to improve the lubricating property, and there is a problem that it is unclear that dimple arrangement influences a lubricating performance in what way.

An object of the present invention is to provide sliding components with which by finding out a relationship between dimple arrangement and a lubricating performance in a case where plural dimples are randomly arranged, a lubricating property and a sealing property can be improved.

Solution to Problem

The inventors of the present invention conducted numerical experiments of arrangement conditions of 200 cases by using experiment plans based on the Latin hypercube method in sliding components in which plural dimples are randomly arranged on sliding surfaces. As a result, the inventors obtained a finding that there is the following relationships between dimple arrangement and a lubricating characteristic.

It also became clear that torque of the sliding surfaces that slide with respect to each other correlates to an angular-direction standard deviation $\sigma_\theta$ of dimples forming a dimple group (Spearman's rank-correlation coefficient of 0.595). As shown in FIG. 2, when the angular-direction standard deviation $\sigma_\theta$ is smaller than one, more preferably, smaller than 0.8, an inflow characteristic from the outer peripheral side (sealed fluid side) of the sliding surfaces to the sliding surfaces is improved and large torque is less easily generated. The angular-direction standard deviation $\sigma_\theta$ is obtained by normalizing a standard deviation of angular-direction coordinates of the dimples forming the random dimple group with a standard deviation of angular-direction coordinates of dimples forming an aligned dimple group, and indicates a dispersion degree of a dimple group in the angular direction.

The sliding components of the present invention are to solve the problems described above by utilizing the finding described above.

Sliding components according to a first aspect of the present invention are a pair of sliding components having sliding surfaces that slide with respect to each other, characterized in that at least the sliding surface on one side includes a random dimple group in which plural dimples are randomly arranged, and the random dimple group is arranged to be biased in the circumferential direction of the sliding surface on one side.

According to the first aspect, a fluid lubricating effect is improved by arranging the random dimple group to be biased in the circumferential direction of the sliding surface by utilizing the finding described above, and the fluid lubricating effect that the random dimple group has is synergistically increased. Thus, it is possible to provide the sliding components excellent in a lubricating property. The fluid lubricating effect is an effect of improving the lubricating property by letting a fluid flow from the sealed fluid side to the sliding surface and forming a thick liquid film.

The sliding components according to a second aspect of the present invention are characterized in that the random dimple group is a band shaped body in which the plural dimples are arranged from an inner peripheral portion of the sliding surface to an outer peripheral portion.

According to the second aspect, the fluid lubricating effect is improved with the random dimple group of the band shaped body biased in the circumferential direction of the sliding surface, and the fluid lubricating effect that the random dimple group has is synergistically increased. Thus, it is possible to provide the sliding components excellent in a sealing property and the lubricating property.

The sliding components according to a third aspect of the present invention are characterized in that an angular-direction standard deviation of the random dimple group is less than one.

The sliding components according to a fourth aspect of the present invention are characterized in that the dimples are arranged in such a manner that an angular-direction standard deviation of the random dimple group is less than 0.8.

According to the third or fourth aspect, by utilizing the angular-direction standard deviation of the random dimple group, it is possible to determine dimple arrangement of the random dimple group excellent in the lubricating property.

The sliding components according to a fifth aspect of the present invention are characterized by comprising at least one land portion that separates the random dimple groups in the circumferential direction of the sliding surface.

According to the fifth aspect, the fluid flowing in the circumferential direction through the random dimple group is blocked by the land portion, and it is possible to obtain a further thick fluid film. Thus, surface roughness of the sliding surface is prevented, and hence it is possible to provide the sliding components excellent in reliability of the sealing property.

The sliding components according to a sixth aspect of the present invention are characterized in that the land portion is a flat surface running from the inner peripheral portion of the sliding surface to the outer peripheral portion and having a circumferential width narrower than circumferential width of the random dimple group.

According to the sixth aspect of the present invention, by separating the random dimple groups having various angular-direction standard deviations by the land portion, a thick fluid film is formed, and the sliding components can adapt to various rotation numbers and temperatures (viscosity).

BRIEF DESCRIPTION OF THE DRAWINGS

FIG. 7 is a W-W arrow view of FIG. 1, showing an example of the sliding surface of the sliding component including the random dimple groups and the land portions according to the second embodiment of the present invention, and showing a case of "angular-direction standard deviation $\sigma_\theta$=0.896."

FIG. 8 is a W-W arrow view of FIG. 1, showing an example of the sliding surface of the sliding component including the random dimple groups and the land portions according to the second embodiment of the present invention, and showing a case of "angular-direction standard deviation $\sigma_\theta$=0.946."

DESCRIPTION OF EMBODIMENTS

Hereinafter, with reference to the drawings, modes for carrying out the present invention will be described as examples based on embodiments. However, the dimensions, the materials, the shapes, the relative arrangements, etc. of constituent components described in the embodiments are not intended to limit the scope of the present invention only to them unless otherwise described explicitly.

First Embodiment

With reference to FIGS. 1 to 5, sliding components according to a first embodiment of the present invention will be described.

In the following embodiment, as an example, a mechanical seal that is an example of the sliding components will be described. However, the present invention is not limited to this but for example can also be utilized as a sliding component of a bearing that slides with a rotating shaft while sealing lubricating oil on the axially one side of a cylindrical sliding surface.

The outer peripheral side of the sliding component forming the mechanical seal will be described as the high pressure fluid side (sealed fluid side), and the inner peripheral side as the low pressure fluid side (leakage side).

Figure 1:
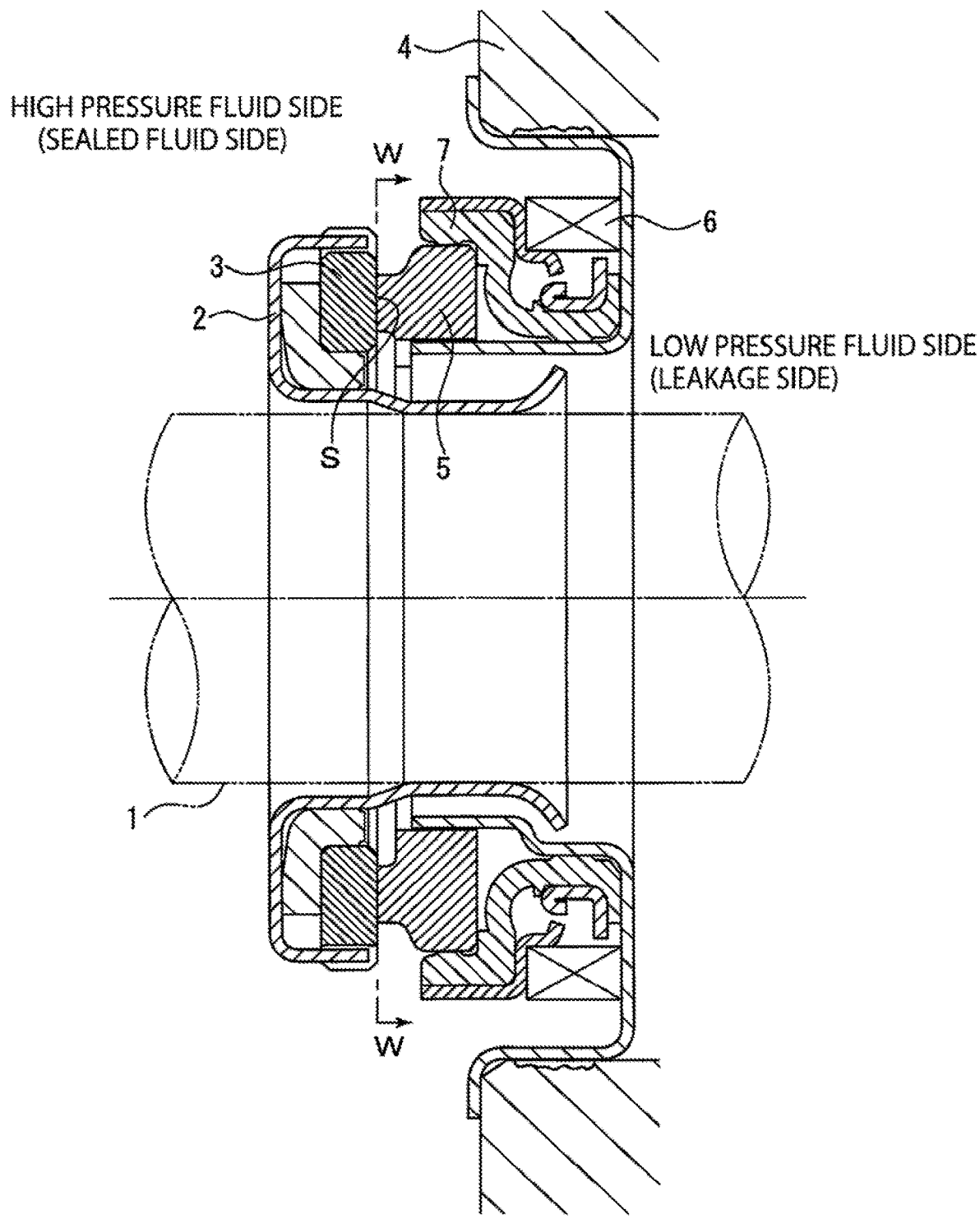
FIG. 1 is a vertically sectional view showing an example of a mechanical seal according to a first embodiment of the present invention.
Figure 2:
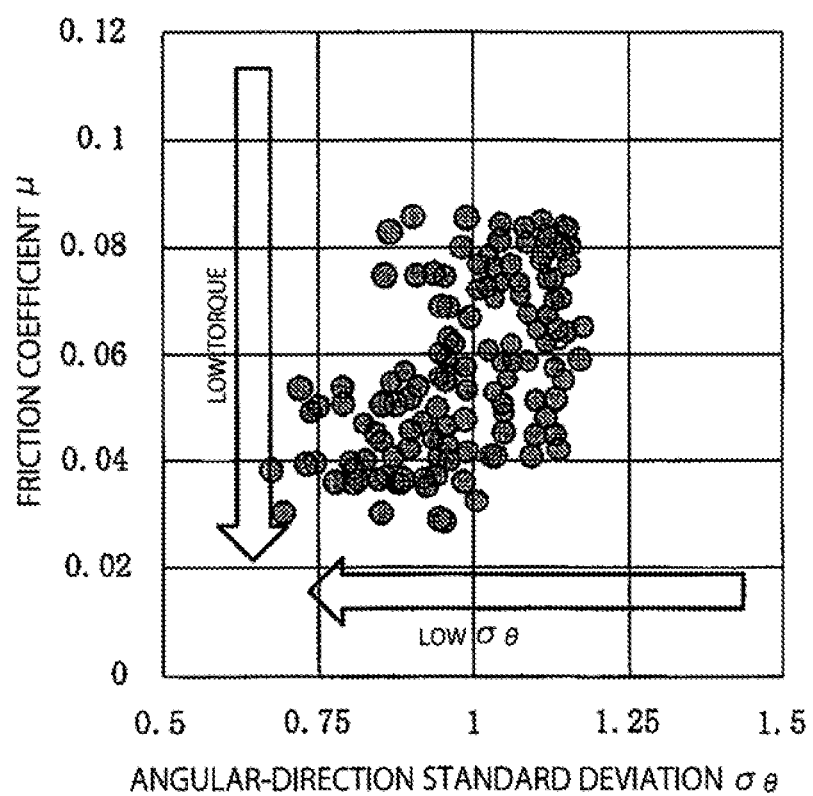
FIG. 2 is an illustrative view for illustrating the principle of the present invention, showing correlation between sliding torque of a sliding component and an angular-direction standard deviation $\sigma_\theta$.

FIG. 1 is a vertically sectional view showing an example of the mechanical seal, which is an inside mechanical seal in the form of sealing a sealed fluid on the high pressure fluid side to leak from the outer periphery of sliding surfaces toward the inner periphery. The mechanical seal is provided with an annular rotating side seal ring 3 serving as one sliding component provided across a sleeve 2 on the side of a rotating shaft 1 that drives a pump impeller (not shown) on the high pressure fluid side in a state where the rotating side seal ring is rotatable integrally with this rotating shaft 1, and an annular stationary side seal ring 5 serving as the other sliding component provided in a housing 4 of a pump in a non-rotating state and an axially movable state. With a coiled wave spring 6 and a bellows 7 axially biasing the stationary side seal ring 5, the seal rings slide in close contact with each other at sliding surfaces S. That is, this mechanical seal prevents an outflow of the sealed fluid from the outer peripheral side of the rotating shaft 1 to the inner peripheral side at the sliding surfaces S of the rotating side seal ring 3 and the stationary side seal ring 5.

FIG. 1 shows a case where width of the sliding surface of the rotating side seal ring 3 is greater than width of the sliding surface of the stationary side seal ring 5. However, the present invention is not limited to this but is also applicable to the opposite case as a matter of course.

The material of the rotating side seal ring 3 and the stationary side seal ring 5 is selected from silicon carbide (SiC) excellent in wear resistance, carbon excellent in self-lubricity, etc. For example, both the seal rings can be made of SiC or the rotating side seal ring 3 of SiC and the stationary side seal ring 5 of carbon can be combined.

Dimples are arranged on at least any one of the sliding surfaces of the rotating side seal ring 3 and the stationary side seal ring 5 that slide with respect to each other.

In the present invention, the "dimples" are dents formed on the flat sliding surface S, and the shape thereof is not particularly limited. For example, the planar shape of the dents includes a circle, a triangle, an ellipse, an oval, or a rectangle. The sectional shape of the dents also includes various shapes such as a bowl shape or a square.

In the present example, a case where plural dimples are randomly arranged on the sliding surface S of the stationary side seal ring 5 will be described. In this case, dimples may be provided or not provided in the rotating side seal ring 3. Random arrangement indicates arrangement excluding aligned arrangement in which dimples are arranged on a regular basis, and does not include zig-zag arrangement.

By randomly arranging dimple groups on the sliding surface, it is possible to improve contradictory functions of lubricating and sealing. A mechanism to improve the lubricating function and the sealing function is as follows.

When the opposing sliding surface is relatively moved, the fluid is suctioned into hole portions of the dimples formed on the sliding surface by viscosity of the fluid, and negative pressure is generated in a part on the upstream side of the hole portions, and positive pressure is generated in a part on the downstream side by the wedge effect. At that time, in the negative pressure part on the upstream side of the hole portions, a liquid film is broken and a cavity is formed due to steam and bubbles of a liquid (cavitation), so that negative pressure is cancelled. As a result, only positive pressure remains and a load capacity is generated, and hence the sliding surface S is brought up. When the sliding surface S is brought up, a gap between the two sliding surfaces that slide with respect to each other is increased, and the fluid having a lubricating property flows into the sliding surfaces S, so that the lubricating function is obtained.

The pressure of the fluid suctioned into the dimples is boosted in the dimples and the fluid is discharged from the dimples. That is, the suction of the fluid into the dimples and the discharge of the fluid whose pressure is boosted from the dimples are consecutively performed. When the plural dimples are randomly arranged, the fluid suctioned into and discharged from the dimples arranged on the inner peripheral side of the sliding surface is consecutively and repeatedly suctioned into and discharged from the dimples arranged on the further outer diameter side. Thus, the sealing function in which the fluid is gradually delivered from the inner diameter side to the outer dimeter side is obtained.

Figure 3:
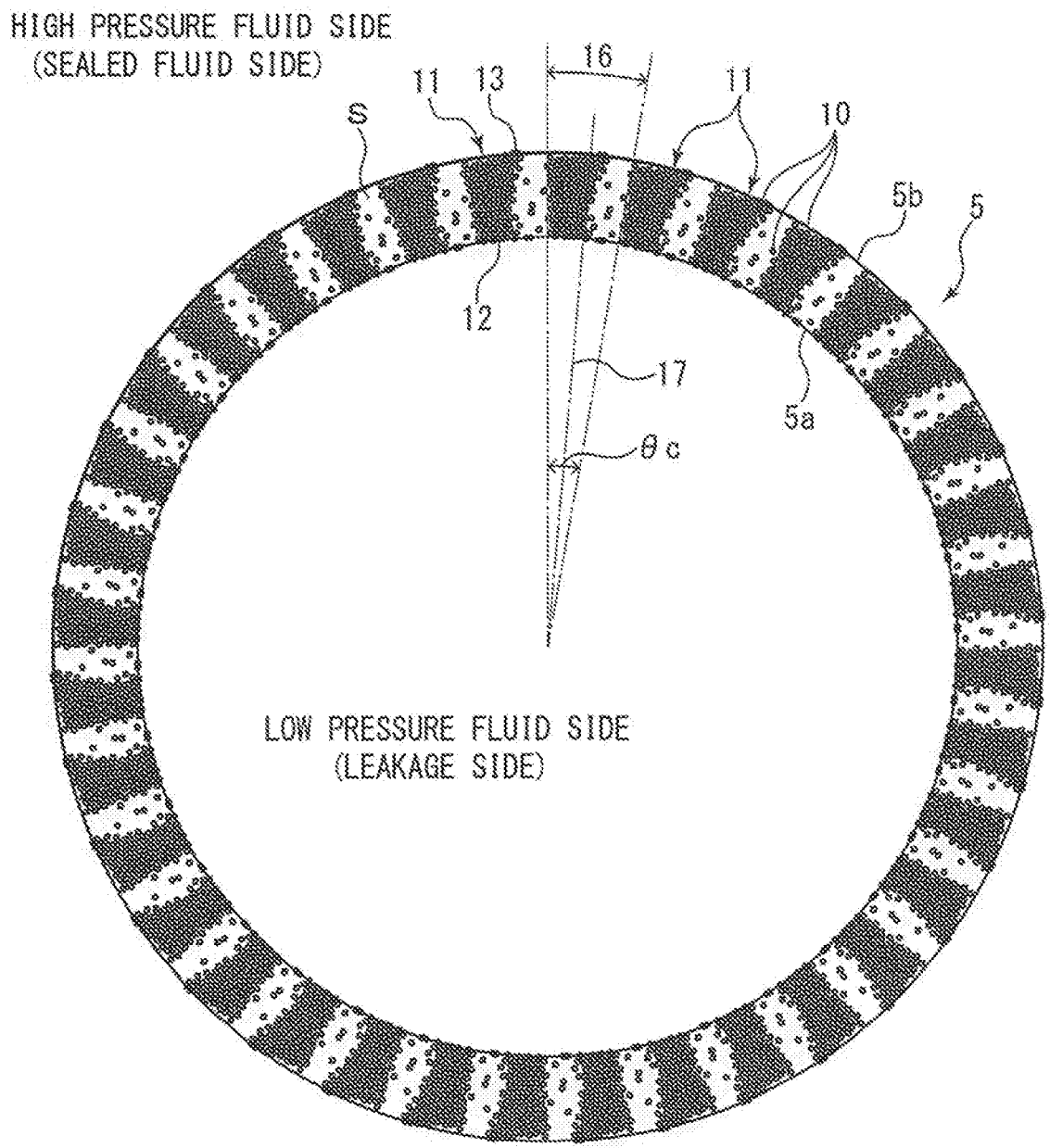
FIG. 3 is a W-W arrow view of FIG. 1, showing an example of a sliding surface of a sliding component including random dimple groups according to the first embodiment of the present invention, and showing a case of "angular-direction standard deviation $\sigma_\theta$=0.776."

In FIG. 3, the sliding surface S of the stationary side seal ring 5 is equally divided into plural (thirty-six in FIG. 3) sections 16, and a random dimple group 11 in which plural dimples 10 are randomly arranged is arranged in each of the sections 16. In the random dimple group 11, the plural dimples 10 are arranged from an inner peripheral portion 5a of the sliding surface S (leakage side) to an outer peripheral portion 5b (sealed fluid side), and an outer peripheral portion 13 of the random dimple group 11 is an opening portion in direct contact with the sealed fluid side. An inner peripheral portion 12 of the random dimple group 11 is an opening portion in direct contact with the leakage side. Further, the random dimple group 11 is arranged to be biased in the circumferential direction. In FIG. 3, although the plural dimples 10 are arranged in the section 16 to be biased on one side in the circumferential direction, the dimples may be arranged to be biased in a center portion of the section 16. Thereby, a part where the dimples 10 are densely arranged and a part where the dimples are sparsely arranged are arranged periodically in the circumferential direction. Specifically, the random dimple group is arranged in the section 16 in such a manner that an angular-direction standard deviation $\sigma_\theta$ of the dimples 10 forming the random dimple group 11 is less than one, and formed in a band shaped body extending in the radial direction.

The angular-direction standard deviation $\sigma_\theta$ (normalized angular-direction standard deviation) is obtained by normalizing a standard deviation $\sigma 11$ of angular-direction coordinates of the dimples 10 forming the random dimple group 11 with a standard deviation $\sigma_r$ of angular-direction coordinates of uniformly arranged dimples forming an aligned dimple group, and expressed as the following expression 1.

angular-direction standard deviation $\sigma_\theta$ "standard deviation $\sigma 11$ of angular-direction coordinates of random dimple group"/"standard deviation $\sigma_r$ of angular-direction coordinates of aligned dimple group (Expression 1)

In the random dimple group 11, when the dimples are arranged in such a manner that the angular-direction standard deviation $\sigma_\theta$ is less than one, an effect of letting the fluid flow from the sealed fluid side to the sliding surface and improving the lubricating property (hereinafter, referred to as the "fluid lubricating effect") is enhanced. Thus, the lubricating property of the sliding surface S is improved and generation of large torque (resistance of sliding) is prevented. When the dimples are arranged in such a manner that the angular-direction standard deviation is less than 0.8, the fluid lubricating effect is furthermore enhanced and the lubricating property is improved. Thus, surface roughness of the sliding surface S is prevented and reliability of a sealing property is improved. In the present invention, the random dimple group in which the dimples are arranged in such a manner that the angular-direction standard deviation is less than one will be called as the "lubricating random dimple group".

In FIG. 3, the dimples 10 are not just randomly arranged in each of the sections 16 but the dimples 10 are randomly arranged in the section 16 according to the following procedure.

(1) The dimples 10 are regarded as point-mass electrons, and with Coulomb force acting between the electrons, the plural dimples 10 are arranged in a block by using software.

(2) Imaginary force is operated by software, so that the dimples 10 are arranged to be biased in the circumferential direction of the sliding surface.

(3) With the coordinates of the dimples biased in the circumferential direction, the standard deviation $\sigma 11$ of the angular-direction coordinates of the random dimple group is calculated by using software.

(4) Based on the expression 1 described above, whether or not the angular-direction standard deviation $\sigma_\theta$ obtained by normalizing the angular-direction standard deviation of the random dimple group 11 with the standard deviation $\sigma_r$ of the angular-direction coordinates of the aligned dimple group is less than one is confirmed. If less than one, the angular-direction standard deviation is adopted.

(5) In a case where the angular-direction standard deviation $\sigma_\theta$ is larger than one, the operations (2) to (4) described above are repeated.

The standard deviation $\sigma_r$ of the angular-direction coordinates of the aligned dimple group will be described. In FIG. 3, the sliding surface S is equally divided into the thirty-six sections 16. Thus, a center angle θc of the section 16 is 10°, and an equal position of the section 16 from a center position 17 is a position of 2.5°. Therefore, the standard deviation $\sigma_r$ of the angular-direction coordinates of the aligned dimple group in a case of thirty-six sections at equal intervals is 2.5°. Even in a case where the size of the center angle θc of the section 16 is different from 10°, the standard deviation $\sigma_r$ of the angular-direction coordinates of the aligned dimple group is also calculated by the same procedure.

Figure 4:
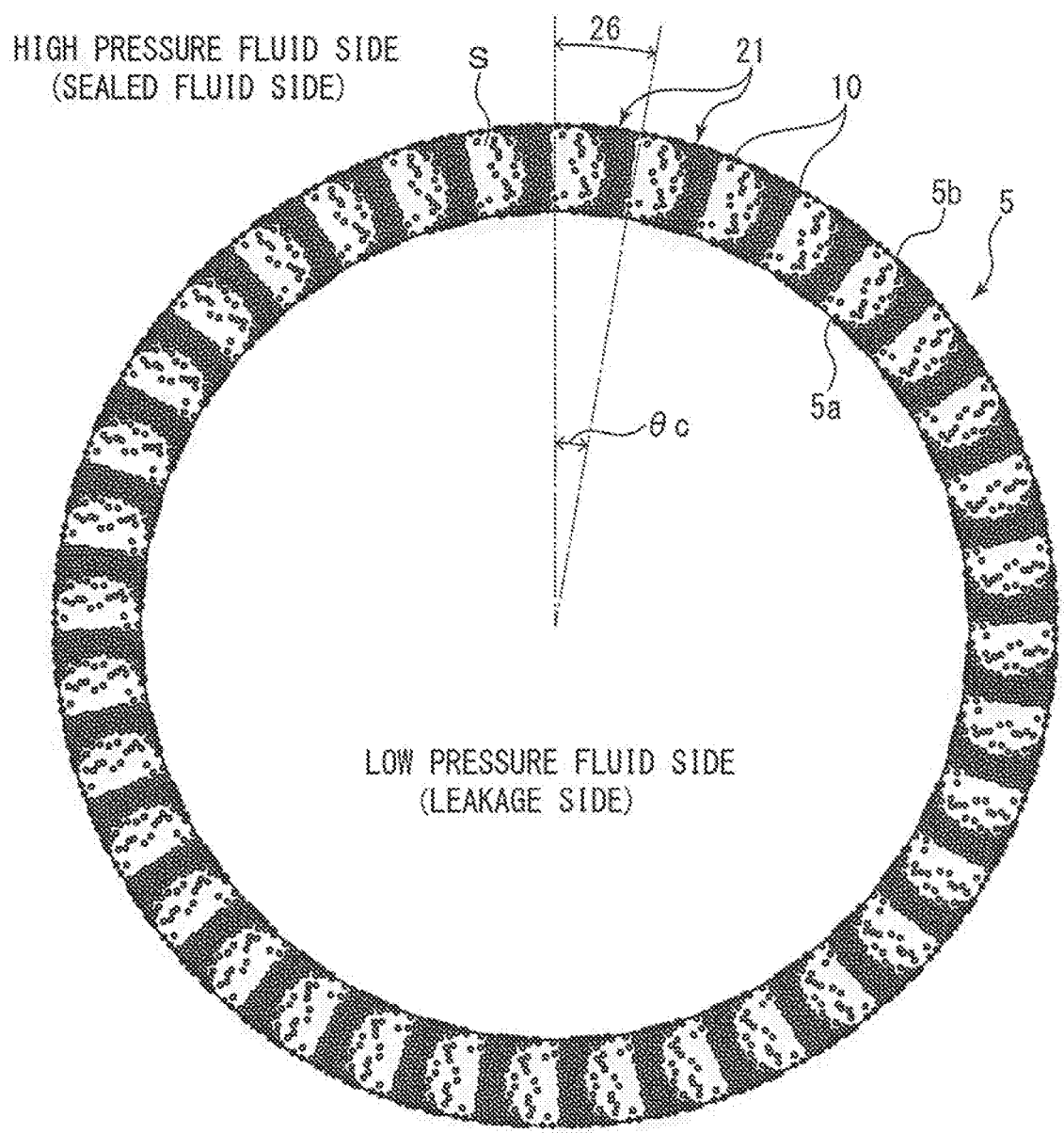
FIG. 4 is a W-W arrow view of FIG. 1, showing an example of the sliding surface of the sliding component including the random dimple groups according to the first embodiment of the present invention, and showing a case of "angular-direction standard deviation $\sigma_\theta$=0.896."
Figure 5:
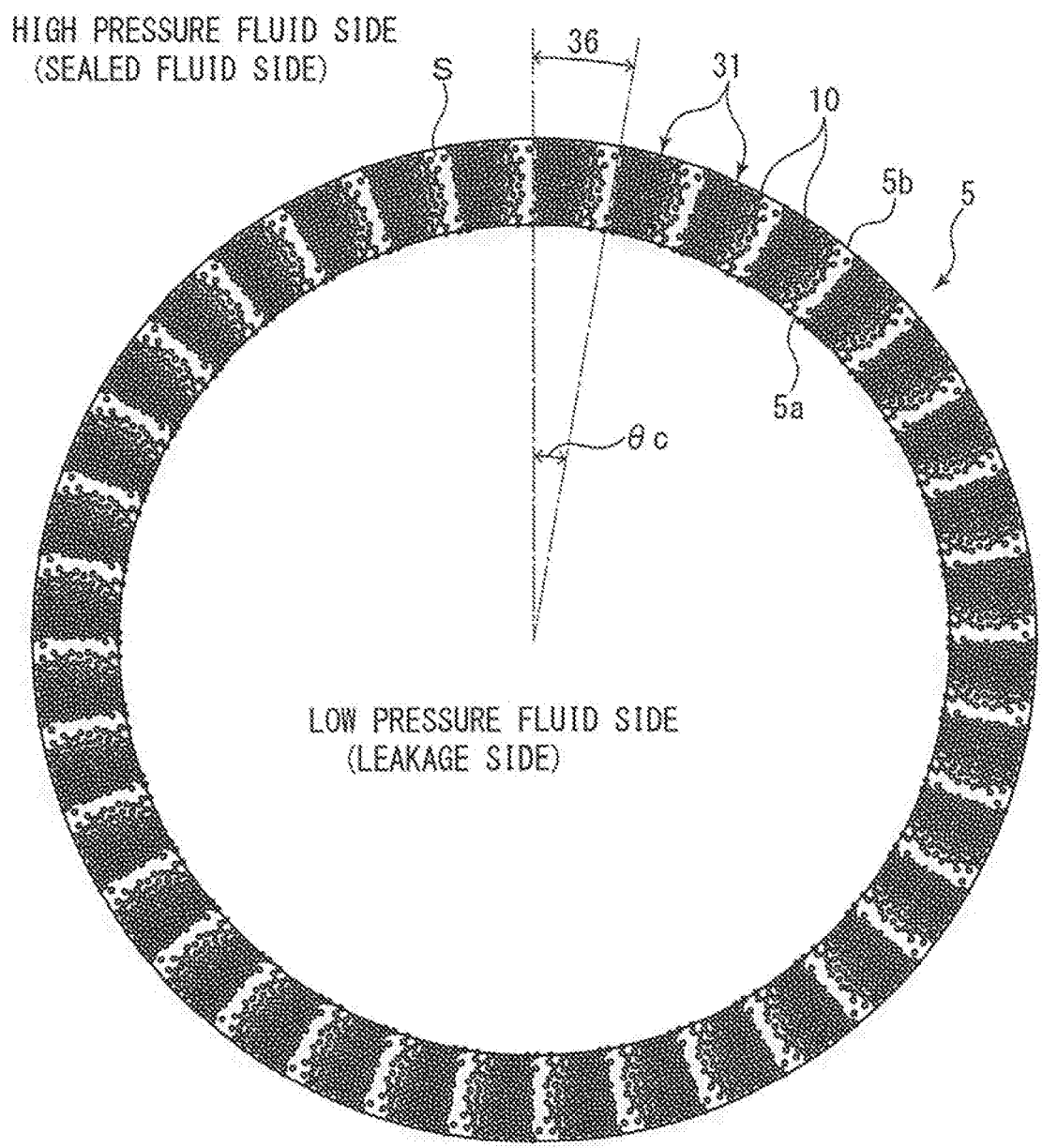
FIG. 5 is a W-W arrow view of FIG. 1, showing an example of the sliding surface of the sliding component including the random dimple groups according to the first embodiment of the present invention, and showing a case of "angular-direction standard deviation $\sigma_\theta$=0.946."

FIGS. 4 and 5 are examples of random arrangement of the dimples 10 determined by the procedure described above. In the example of FIG. 4, an angular-direction standard deviation $\sigma_\theta$ of a random dimple group 21 arranged in a section 26 is 0.896, and in the example of FIG. 5, an angular-direction standard deviation $\sigma_\theta$ of a random dimple group 31 arranged in a section 36 is 0.946. The smaller the angular-direction standard deviation $\sigma_\theta$ is, the more the fluid lubricating effect in which the fluid flows from the sealed fluid side to the sliding surface is enhanced. Thus, the surface roughness of the sliding surface S is prevented and the reliability of the sealing property is improved.

The random dimple groups 11, 21, 31 of FIGS. 3 to 5 show examples of the random arrangement of the dimples 10. Even with the same angular-direction standard deviation $\sigma_\theta$, there are countless different patterns of the random arrangement of the dimples 10.

In a case of FIG. 3, the sliding surface S is equally divided into the thirty-six sections 16 and a random dimple group 11 is arranged in each block. However, the present invention is not limited to the thirty-six sections at equal intervals but the number of blocks may be one or the sliding surface may be divided into a natural number which is two or more.

All the thirty-six random dimple groups 11 of FIG. 3 have the same angular-direction standard deviation $\sigma_\theta$. However, the present invention is not limited to this. When the angular-direction standard deviation is smaller than one, random dimple groups 11 having different angular-direction standard deviations $\sigma_\theta$ may be arranged in the sections 16. The same applies to the random dimple groups 21, 31 of FIGS. 4, 5.

In FIGS. 3 to 5, the thirty-six sections 16, 26, 36 have the same center angle θc. However, the present invention is not limited to this but the plural sections 16, 26, 36 may have different center angles.

Second Embodiment

Figure 6:
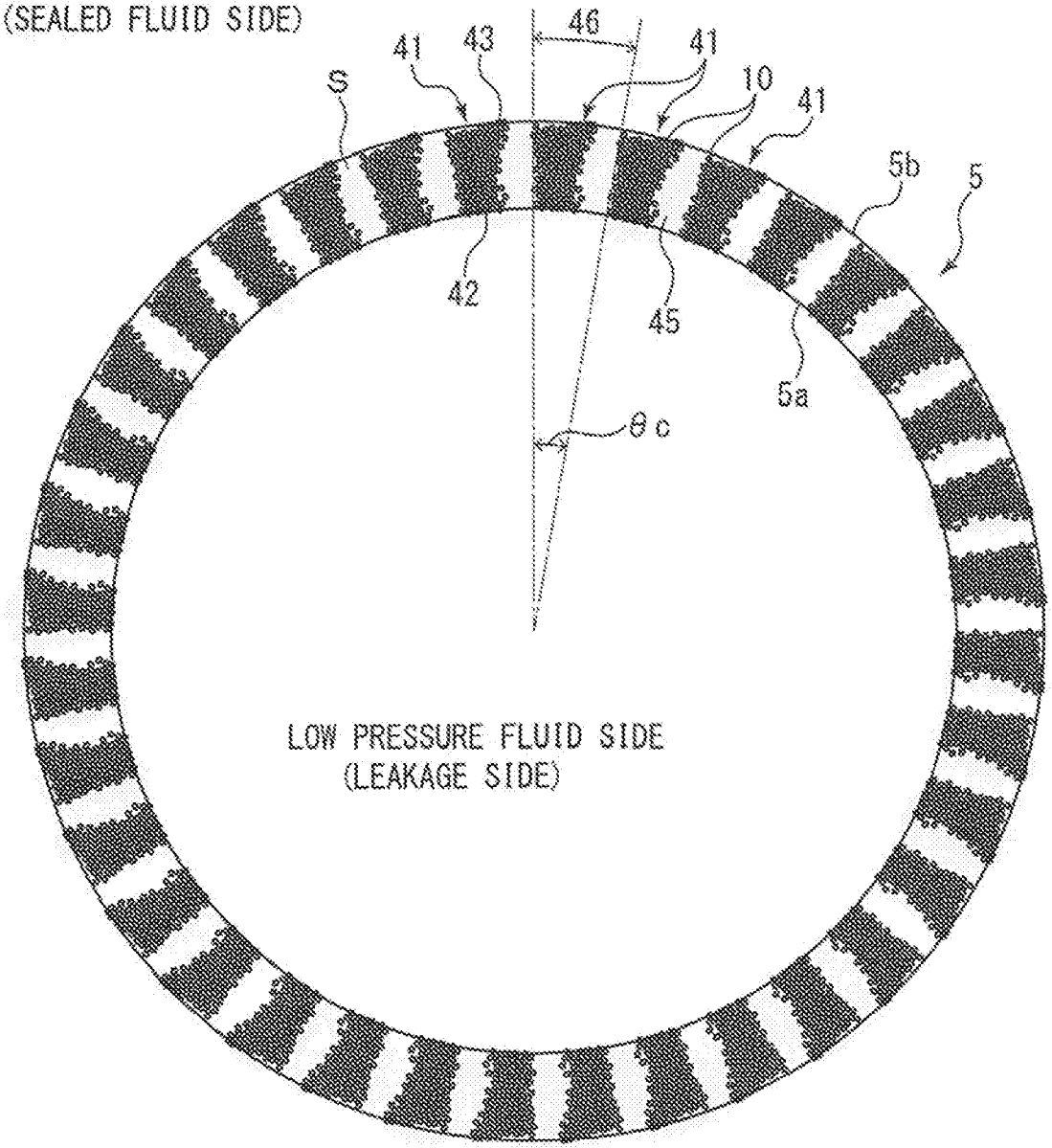
FIG. 6 is a W-W arrow view of FIG. 1, showing an example of a sliding surface of a sliding component including random dimple groups and land portions according to a second embodiment of the present invention, and showing a case of "angular-direction standard deviation $\sigma_\theta$=0.776."

With reference to FIGS. 6 to 8, sliding components according to a second embodiment of the present invention will be described.

The sliding components according to the second embodiment are different from the sliding components of the first embodiment in a point that land portions that separate random dimple groups in the circumferential direction of a sliding surface are provided. However, the other basic configurations are the same as the first embodiment. The same members will be given the same reference signs and duplicated description will be omitted.

In FIG. 6, a sliding surface S of a stationary side seal ring 5 is equally divided into plural (thirty-six in FIG. 6) sections 46 and a random dimple group 41 and a land portion 45 are arranged in each of the sections 46. The random dimple groups 41 are formed by arranging plural dimples 10 in the sections 46 by the method described above and forming random dimple groups, and then eliminating some dimple groups so as to form the land portions. In each of the random dimple groups 41, the plural dimples 10 are arranged from an inner peripheral portion 5a of the sliding surface S (leakage side) to an outer peripheral portion 5b (sealed fluid side), and an outer peripheral portion 43 of the random dimple group 41 is an opening portion in direct contact with the sealed fluid side. An inner peripheral portion 42 of the random dimple group 41 is an opening in direct contact with the leakage side. Further, the random dimple group 41 is arranged to be biased in the circumferential direction. Specifically, the random dimple group is arranged in the section 46 in such a manner that an angular-direction standard deviation $\sigma_\theta$ of the dimples 10 forming the random dimple group 41 is less than one, and formed in a band shaped body extending in the radial direction. Each of the land portions 45 is a flat surface running over the entire length from the inner peripheral portion 5a of the sliding surface S (leakage side) to the outer peripheral portion 5b (sealed fluid side) and having circumferential width narrower than circumferential width of the random dimple group 41. By the land portions 45, the random dimple group 41 is separated from other adjacent random dimple groups 41.

The random dimple group 41 is formed by a lubricating random dimple group 41 made by arranging the plural dimples 10 in such a manner that the angular-direction standard deviation $\sigma_\theta$ of the random dimple group 41 arranged in the section 46 is 0.766. Thereby, the random dimple group 41 is arranged to be biased on one side in the circumferential direction of the section 46. Thus, the fluid lubricating effect is improved and generation of large torque (resistance of sliding) is prevented.

Since the random dimple groups 41 adjacent to each other are separated by the land portion 45, the fluid flowing through the random dimple group 41 is blocked by the land portion 45 and an effect of generating positive dynamic pressure (hereinafter, referred to as the "dynamic pressure generation effect") is obtained. Thus, the lubricating property of the sliding surface S is furthermore improved, the surface roughness of the sliding surface S is prevented, and the reliability of the sealing property is improved.

FIGS. 7 and 8 are other examples of random arrangement of the dimples 10. In the example of FIG. 7, an angular-direction standard deviation $\sigma_\theta$ of a random dimple group 51 is 0.896, and in the example of FIG. 8, an angular-direction standard deviation $\sigma_\theta$ of a random dimple group 61 is 0.946. As shown in FIGS. 6 to 8, the smaller the angular-direction standard deviation $\sigma_\theta$ is, the more the random dimple group is arranged to be biased on one side in the circumferential direction of the sliding surface S. When the angular-direction standard deviation $\sigma_\theta$ is smaller than one, more preferably, smaller than 0.8, the fluid lubricating effect is enhanced and generation of large torque (resistance of sliding) is prevented.

As described above, by making the angular-direction standard deviation $\sigma_\theta$ of the random dimple groups 41, 51, 61 smaller than one, the fluid lubricating effect is enhanced, and the lubricating property of the sliding surfaces is improved. Further, the fluid flowing through the random dimple groups 41, 51, 61 is blocked by the land portions 45 and the dynamic pressure generation effect is obtained. Thus, the lubricating property of the sliding surface S is furthermore improved, the surface roughness of the sliding surface S is prevented, and the reliability of the sealing property is improved.

In the examples of FIGS. 6, 7, the sliding surface S is equally divided into the thirty-six sections 46, 56, and in the example of FIG. 8, the sliding surface S is equally divided into twenty-four sections 66. However, the present invention is not limited to this but the number of sections may be one or the sliding surface may be divided into a natural number which is two or more.

In the example of FIG. 6, all the thirty-six random dimple groups 41 have the same angular-direction standard deviation $\sigma_\theta$. However, the present invention is not limited to this. For example, as long as the angular-direction standard deviation is smaller than one, random dimple groups 41 having different angular-direction standard deviations $\sigma_\theta$ may be arranged in the circumferential direction of the sliding surface. The same applies to the random dimple groups 51, 61 of FIGS. 7, 8.

Further, in FIGS. 6 to 8, the sections 46, 56, 66 have the same center angle $\theta c$. However, the present invention is not limited to this but the sections 46, 56, 66 may be formed to have plural different center angles $\theta c$.

The modes in which the present invention is implemented are described with the embodiments above. Specific configurations are not limited to the modes of these embodiments but the present invention also includes changes and additions within the range not departing from the gist of the present invention.

For example, in the first and second embodiments, the examples in which the sliding component is used for at least any one of the pair of the rotating seal ring and the stationary seal ring in the mechanical seal device is described. However, the sliding component can also be utilized as a sliding component of a bearing to slide with a rotating shaft while sealing lubricating oil on the axially one side of a cylindrical sliding surface.

In the first and second embodiments, the outer peripheral side of the sliding component is described as the high pressure fluid side (sealed fluid side), and the inner peripheral side as the low pressure fluid side (leakage side). However, the present invention is not limited to this but is applicable to a case where the outer peripheral side of the sliding component is the low pressure fluid side (leakage side) and the inner peripheral side is the high pressure fluid side (sealed fluid side).

REFERENCE SIGNS LIST

1 rotating shaft
2 sleeve
3 rotating side seal ring
4 housing
5 stationary side seal ring
6 coiled wave spring
7 bellows
10 dimple
11 random dimple group
16 section
17 center position of section
21 random dimple group
26 section
31 random dimple group
36 section
41 random dimple group
45 land portion
46 section
51 random dimple group
55 land portion
56 section
61 random dimple group
66 section
S sliding surface

The invention claimed is:

1. A pair of sliding components comprising sliding surfaces, respectively, that slide with respect to each other, wherein at least one of the sliding surfaces includes a random dimple group in which plural dimples are randomly arranged, and the random dimple group is arranged in a circumferential direction of the at least one sliding surface,
    wherein the random dimple group is a band shaped body in which the plural dimples are arranged from an inner peripheral portion of the at least one sliding surface to an outer peripheral portion of the at least one sliding surface, and
    wherein an angular-direction standard deviation of the random dimple group is less than one.

2. The sliding components according to claim 1, wherein an angular-direction standard deviation of the random dimple group is less than 0.8.

3. The sliding components according to claim 1, wherein the random dimple group comprises a first random dimple group and a second random dimple group, and a land portion that separates the first random dimple group from the second random dimple group is provided in the circumferential direction of the sliding surface.

4. The sliding components according to claim 3, wherein the land portion is a flat surface running from an inner peripheral portion of the at least one sliding surface to an outer peripheral portion of the at least one sliding surface and having a circumferential width narrower than a circumferential width of at least one of the random dimple groups.

5. The sliding components according to claim 2, wherein the random dimple group comprises a first random dimple group and a second random dimple group, and a land portion that separates the first random dimple group from the second random dimple group is provided in the circumferential direction of the sliding surface.

6. The sliding components according to claim 5, wherein the land portion is a flat surface running from an inner peripheral portion of the at least one sliding surface to an outer peripheral portion of the at least one sliding surface and having a circumferential width narrower than a circumferential width of at least one of the random dimple groups.

\* \* \* \* \*